(12) United States Patent
Puthiyaveettil et al.

(10) Patent No.: US 10,800,527 B2
(45) Date of Patent: Oct. 13, 2020

(54) OMNI DIRECTIONAL TURNTABLE ASSEMBLY

(71) Applicant: Goodrich Corporation, Charlotte, NC (US)

(72) Inventors: Sayooj Adavalath Puthiyaveettil, Kerala (IN); Unnikrishnan Vijayan Pillai Jaya, Kerala (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/160,290

(22) Filed: Oct. 15, 2018

(65) Prior Publication Data
US 2020/0055601 A1   Feb. 20, 2020

(51) Int. Cl.
| | | |
|---|---|---|
| *B64D 9/00* | (2006.01) | |
| *B60B 19/00* | (2006.01) | |
| *B65G 35/06* | (2006.01) | |
| *B65G 43/00* | (2006.01) | |

(52) U.S. Cl.
CPC .............. *B64D 9/00* (2013.01); *B60B 19/003* (2013.01); *B65G 35/06* (2013.01); *B65G 43/00* (2013.01); *B60B 2900/212* (2013.01); *B60Y 2200/62* (2013.01); *B64D 2009/006* (2013.01); *B65G 2203/0283* (2013.01); *B65G 2207/48* (2013.01); *B65G 2812/14* (2013.01)

(58) Field of Classification Search
CPC ............ B65G 47/80; B65G 2203/0283; B65G 2812/14; B64D 2009/006; B60Y 2200/62
USPC ........ 198/386, 388, 401, 410, 571, 572, 608
See application file for complete search history.

(56) References Cited

U.S. PATENT DOCUMENTS

| | | | | | |
|---|---|---|---|---|---|
| 3,978,975 | A | * | 9/1976 | Herbes ..................... | B64D 9/00 198/782 |
| 4,050,655 | A | * | 9/1977 | Bogue ....................... | B64C 1/20 244/137.1 |
| 4,589,542 | A | * | 5/1986 | Steadman ................ | B64D 9/00 198/782 |
| 4,981,209 | A | * | 1/1991 | Sogge .................... | B65G 13/10 193/35 MD |
| 5,101,962 | A | * | 4/1992 | Pritchard ................. | B64C 1/20 198/369.4 |
| 5,374,879 | A | * | 12/1994 | Pin .......................... | B25J 5/007 180/21 |
| 5,396,977 | A | * | 3/1995 | Lantis .................... | B65G 13/10 198/371.3 |
| 5,547,069 | A | * | 8/1996 | Pritchard ................ | B64D 9/00 198/782 |
| 5,719,762 | A | * | 2/1998 | Kanayama ............. | B62D 61/12 180/248 |
| 5,739,657 | A | * | 4/1998 | Takayama ............ | G05D 1/0272 180/210 |

(Continued)

OTHER PUBLICATIONS http://www.goodrich.com/cap/systems/Interiors%20Documents/Cargo%20Systems/Freighter%20Common%20Turntable.pdf.*

*Primary Examiner* — Joseph A Dillon, Jr.
(74) *Attorney, Agent, or Firm* — Cantor Colburn LLP (57) ABSTRACT

A turntable assembly for a cargo bay floor including: three omni-directional wheel assemblies oriented in a triangular orientation forming a triangle with one of the three omni-directional wheel assemblies at each corner of the triangle, wherein each of the three omni-directional wheel assemblies include: an omni wheel; and a motor operably connected to the omni wheel, the motor being configured to rotate the omni wheel.

15 Claims, 9 Drawing Sheets

(56) References Cited

U.S. PATENT DOCUMENTS

| | | | | |
|---|---|---|---|---|
| 6,340,085 B1* | 1/2002 | Huber | ..................... | B64D 9/00 |
| | | | | 198/369.4 |
| 6,420,846 B1* | 7/2002 | Wolfe | ..................... | B64D 9/00 |
| | | | | 198/780 |
| 6,557,800 B2* | 5/2003 | Medina | ..................... | B64D 9/00 |
| | | | | 193/35 R |
| 6,705,817 B2* | 3/2004 | Wittenstein | ............. | B64D 9/00 |
| | | | | 244/137.1 |
| 6,871,823 B2* | 3/2005 | Roberts | ..................... | B64C 1/20 |
| | | | | 198/370.09 |
| 7,399,258 B1* | 7/2008 | Sugar | ................. | A63B 22/0235 |
| | | | | 482/51 |
| 7,568,536 B2* | 8/2009 | Yu | ............................ | B60T 7/22 |
| | | | | 15/319 |
| 7,673,738 B2* | 3/2010 | McConnell | ............... | B60P 1/52 |
| | | | | 198/782 |
| 7,717,252 B2* | 5/2010 | Stewart | ................ | B65G 13/065 |
| | | | | 198/782 |
| 7,721,875 B2* | 5/2010 | Stegmiller | ............... | B64D 9/00 |
| | | | | 198/782 |
| 8,515,656 B2* | 8/2013 | Reed | ....................... | B64D 9/00 |
| | | | | 244/137.1 |
| 8,567,587 B2* | 10/2013 | Faist | ..................... | B65G 1/0478 |
| | | | | 198/370.09 |
| 8,752,696 B2* | 6/2014 | Reidhaar | ............. | B60B 19/003 |
| | | | | 180/7.1 |
| 8,978,879 B2* | 3/2015 | Fourney | ................ | B65G 39/04 |
| | | | | 198/782 |
| 9,022,208 B2* | 5/2015 | Huber | ................... | B65G 43/00 |
| | | | | 198/781.05 |
| 9,156,642 B2* | 10/2015 | Dunham | ............ | G03G 15/6582 |
| 9,193,533 B2* | 11/2015 | Fourney | ................ | B65G 39/04 |
| 9,446,846 B1* | 9/2016 | Harms | ..................... | B64D 9/00 |
| 9,481,521 B2* | 11/2016 | Fourney | ................ | B65G 39/04 |
| 9,499,341 B2* | 11/2016 | Wilkins | ................ | B65G 13/065 |
| 9,669,747 B2* | 6/2017 | Turba | ........................ | B60P 1/00 |
| 9,758,330 B2* | 9/2017 | Park | ........................ | B65H 5/06 |
| 10,370,212 B1* | 8/2019 | Atwood | ............ | G03G 15/6567 |
| 10,421,631 B1* | 9/2019 | Johnson | ................... | B41J 13/32 |
| 10,464,753 B2* | 11/2019 | Masciarelli | ............ | B65G 39/09 |
| 10,493,927 B1* | 12/2019 | Widmer | ............... | H02G 3/0487 |
| 10,518,975 B2* | 12/2019 | Itoh | ........................ | B65G 47/54 |
| 2004/0037684 A1* | 2/2004 | Roberts | ..................... | B64C 1/20 |
| | | | | 414/529 |
| 2007/0205081 A1* | 9/2007 | Kyutoku | ................ | G65G 43/08 |
| | | | | 198/373 |
| 2009/0120767 A1* | 5/2009 | Stewart | ................ | B65G 13/065 |
| | | | | 198/782 |
| 2013/0037388 A1* | 2/2013 | Faist | ..................... | B65G 1/0478 |
| | | | | 198/610 |
| 2013/0220775 A1* | 8/2013 | Faist | ..................... | B65G 1/0478 |
| | | | | 198/608 |
| 2015/0108276 A1* | 4/2015 | Panzram | ................... | B64C 1/20 |
| | | | | 244/137.1 |
| 2015/0217958 A1* | 8/2015 | Dunham | ............ | G03G 15/6582 |
| | | | | 271/3.18 |
| 2016/0023848 A1* | 1/2016 | Fourney | ................ | B65G 39/04 |
| | | | | 198/782 |
| 2016/0288907 A1* | 10/2016 | Harms | ..................... | B64D 9/00 |
| 2017/0015233 A1* | 1/2017 | Hindy | ..................... | B64D 9/00 |
| 2017/0313423 A1* | 11/2017 | Schoen | ................ | B64D 9/003 |
| 2018/0194468 A1* | 7/2018 | Brown | ..................... | B64D 9/00 |
| 2018/0222677 A1* | 8/2018 | Chitragar | .................. | B64C 1/20 |
| 2018/0354721 A1* | 12/2018 | Stegmiller | ............ | B65G 13/065 |
| 2019/0308833 A1* | 10/2019 | Johnson | ................... | B41J 13/32 |
| 2020/0047887 A1* | 2/2020 | Clos | ........................ | B64D 9/00 |

* cited by examiner

OMNI DIRECTIONAL TURNTABLE ASSEMBLY

CROSS-REFERENCE TO RELATED APPLICATIONS

This application claims the benefit of Provisional Indian Application No. 201811030856 filed Aug. 17, 2018, which is incorporated herein by reference in its entirety.

BACKGROUND

The subject matter disclosed herein generally relates to the cargo loading, and more particularly to an apparatus and method for loading cargo.

Conventional cargo bay floors typically incorporate freight common turntables (FCT) that utilize driving rollers that drive unit load devices (ULD) along the FCT within an aircraft cargo bay by actively rotating wheels of the driving rollers to move and transfer ULD from one driving roller to another. In order to change the direction of the ULD the driving roller must drop below the FCT and rotate to the desired direction of motion. Once the desired direction of motion is achieved then the driving roller may rise back up above the FCT and move the ULD. This process to change the direction of the ULD ultimately delays the loading process of ULD.

BRIEF SUMMARY

According to one embodiment, a turntable assembly for a cargo bay floor is provided. The turntable assembly including: three omni-directional wheel assemblies oriented in a triangular orientation forming a triangle with one of the three omni-directional wheel assemblies at each corner of the triangle, wherein each of the three omni-directional wheel assemblies include: an omni wheel; and a motor operably connected to the omni wheel, the motor being configured to rotate the omni wheel.

In addition to one or more of the features described above, or as an alternative, further embodiments may include that the omni wheel further includes a plurality of rollers positioned along an outer circumference of the omni wheel.

In addition to one or more of the features described above, or as an alternative, further embodiments may include that the plurality of rollers are oriented on two circular rings of the omni wheel, the two circular rings being coaxial and adjacent to each other.

In addition to one or more of the features described above, or as an alternative, further embodiments may include that the plurality of rollers are configured to rotate in a direction about perpendicular to a direction of a tangential angular velocity vector of the omni wheel.

In addition to one or more of the features described above, or as an alternative, further embodiments may include that the plurality of rollers are configured to rotate in a direction about perpendicular to a direction of a tangential angular velocity vector of the omni wheel.

In addition to one or more of the features described above, or as an alternative, further embodiments may include that the motor is operably connected to the omni wheel through a bushing.

In addition to one or more of the features described above, or as an alternative, further embodiments may include that the omni-wheel includes an inner orifice and the bushing is secured to the inner orifice of the omni-wheel.

In addition to one or more of the features described above, or as an alternative, further embodiments may include that the motor includes a drive shaft having external splines and the bushing includes internal splines, and wherein the external splines of the drive shaft are configured to mate with the internal splines of the bushing.

In addition to one or more of the features described above, or as an alternative, further embodiments may include: a wear cover configured to protect the omni wheel from impacts in a direction about perpendicular to a direction of a tangential angular velocity vector of the omni wheel.

In addition to one or more of the features described above, or as an alternative, further embodiments may include that the wear cover has a ramp shape to direct an object upward and over the omni wheel.

In addition to one or more of the features described above, or as an alternative, further embodiments may include: a sensor unit configured to detect when an object is located above each of the three omni-directional wheel assemblies.

In addition to one or more of the features described above, or as an alternative, further embodiments may include" three sensor units, each of the three sensor units being located proximate to each of the three omni-directional wheel assemblies.

In addition to one or more of the features described above, or as an alternative, further embodiments may include that each of the three sensor units are configured to detect changes in light.

In addition to one or more of the features described above, or as an alternative, further embodiments may include: a control unit configured to control and coordinate the operation of the omni-directional wheel assemblies.

In addition to one or more of the features described above, or as an alternative, further embodiments may include that the triangle is an equilateral triangle.

In addition to one or more of the features described above, or as an alternative, further embodiments may include that each omni-directional wheel assembly includes two wear covers.

According to another embodiment, a cargo bay floor is provided. The cargo bay floor including: one or more turntable assemblies located within a plane of the cargo bay floor, the one or more turntable assemblies each including: three omni-directional wheel assemblies oriented in a triangular orientation forming a triangle with one of the three omni-directional wheel assemblies at each corner of the triangle, wherein each of the three omni-directional wheel assemblies include: an omni wheel; and a motor operably connected to the omni wheel, the motor being configured to rotate the omni wheel.

According to another embodiment, a method of moving unit load devices on the cargo bay floor. The method including: detecting a unit load device above at least one of the one or more turntable assemblies; determining a location of the at least one of the one or more turntable assemblies; determining a next destination of the unit load device; and rotating the omni wheel of the at least one of the one or more turntable assemblies to move the unit load device to the next destination.

Technical effects of embodiments of the present disclosure include utilizing multiple turntable assemblies, each having three omni-directional wheel assemblies to move unit load devices on a cargo bay floor.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
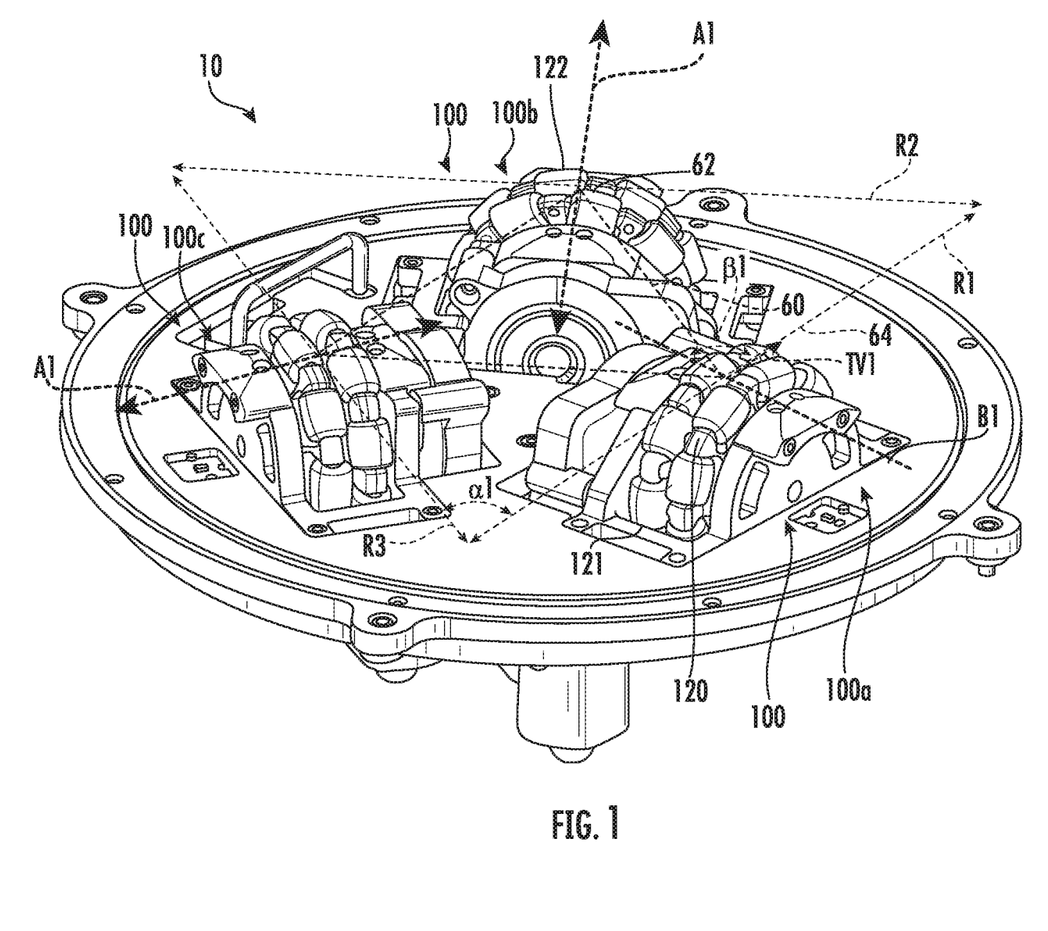
FIG. 1 illustrates an isometric view of a turntable assembly, according to an embodiment of the present disclosure.

Referring to FIG. 1, an isometric view of a turntable assembly 10 is illustrated, in accordance with an embodiment of the present disclosure. The turntable assembly 10 includes three omni-directional wheel assemblies 100. Each of the three omni-directional wheel assemblies 100 may be referred to and identified individually as a first omni-directional wheel assembly 100a, a second omni-directional wheel assembly 100a, and a third omni-directional wheel assembly 100b. In an embodiment, the three omni-directional wheel assemblies 100 may be oriented in a triangular orientation relative to each other, as shown in FIG. 1. In the triangular orientation, each omni-directional wheel assembly 100 may be located at a corner 62 of a triangle 60 of the triangular orientation. In an embodiment, the triangle 60 may be an equilateral triangle.

Figure 2:
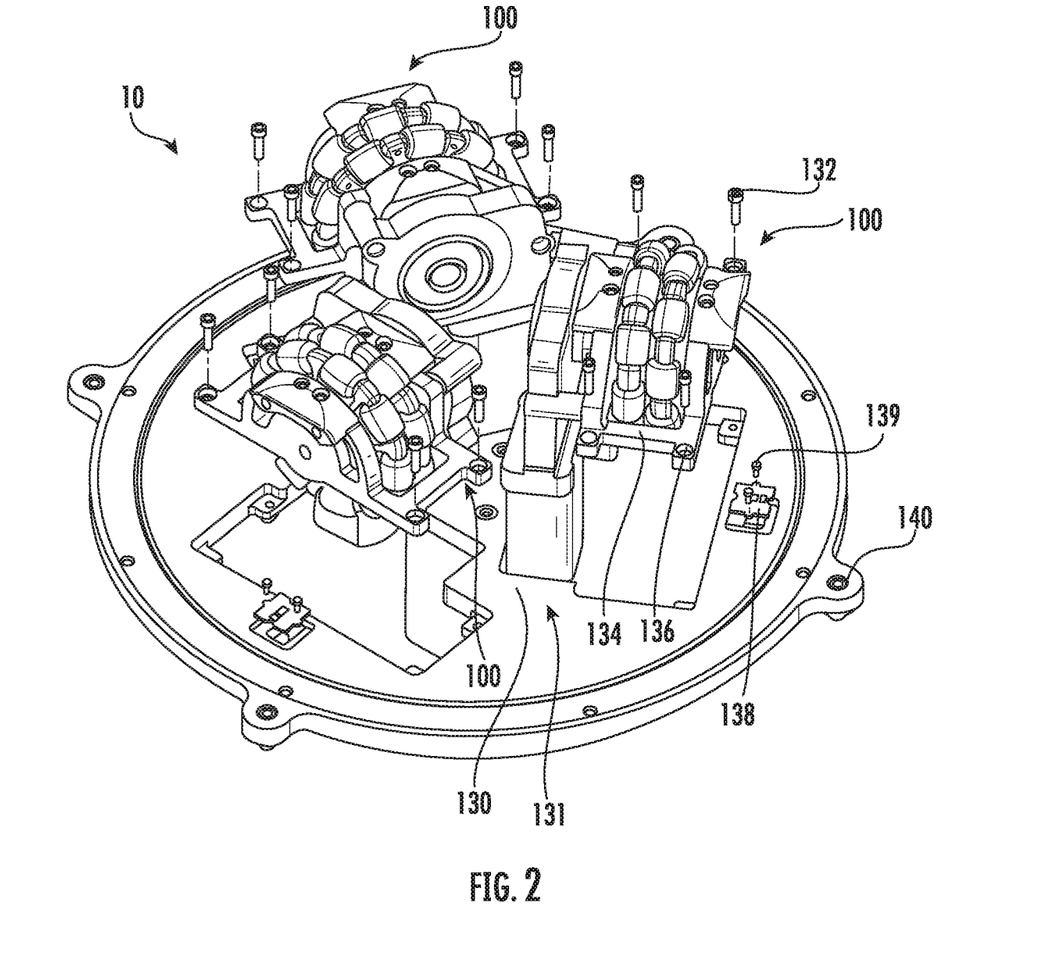
FIG. 2 illustrates an exploded view of the turntable assembly of FIG. 1, according to an embodiment of the present disclosure.

Each omni-directional wheel assembly 100 includes an omni wheel 120 and is capable of rotating the omni wheel 120. The omni wheel 120 is oriented such that the omni wheel 120 is configured to have a tangential angular velocity vector TV1 about perpendicular (e.g. see angle β1 of FIG. 1) to a bisector B1 of a corner 62 of the triangle 60. The omni wheel 120 is configured to move a unit load devices (ULD) (e.g., a cargo container) along a tangential angular velocity vector axis R1, R2, R3 that is tangential to the omni wheel 120. In one example, the first omni-directional wheel assembly 100a includes an omni wheel 120 configured to rotate to move a ULD along a first tangential angular velocity vector axis R1. In a second example, the second omni-directional wheel assembly 100b includes an omni wheel 120 configured to rotate to move a ULD along a second tangential angular velocity vector axis R2. In a third example, the third omni-directional wheel assembly 100b includes an omni wheel 120 configured to rotate to move a ULD along a third tangential angular velocity vector axis R3. In an embodiment, each of the tangential angular velocity vector axis R1, R2, R3 may form an equilateral triangle 64 having three interior angles α1 each equal to about 60°. Each omni wheel 120 may include a plurality of rollers 122 positioned along an outer circumference 121 of the omni wheel 120. The rollers 122 being free to rotate. Each of the rollers 122 is configured to rotate in a direction about perpendicular to a tangential angular velocity vector axis R1, R2, R3, of its respective omni wheel 120, as shown by arrow A1. Advantageously, the rollers 122 allows a single omni-directional wheel assembly 100 to remain motionless while the other two omni-directional wheel assemblies 100 rotate and move a ULD over the single omni-directional wheel assembly 100 using the roller 122 of the single motionless omni-directional wheel assembly 100. For example, the first omni-directional wheel assembly 100a and the third omni-directional wheel assembly 100c may be active, while the second omni-directional wheel assembly 100b may remain motionless, and the roller 122 will allow a ULD to pass over the second omni-directional wheel assembly 100b Referring to FIG. 2 with continued reference to FIG. 1, an exploded view of the turntable assembly 10 is illustrated, in accordance with an embodiment of the present disclosure. The omni-directional wheel assemblies 100 are each secured to a top side 131 of a mounting plate 130 by one or more fastening mechanisms 132. The mounting plate 130 including a top side 131 and a bottom side 133 opposite the top side (see FIG. 3). In an embodiment, the fastening mechanism 132 may be bolts or screws. In another embodiment, four bolts or screws may secure a roller motor mount 134 of the omni-directional wheel assembly 100 to the mounting plate 130, as shown in FIG. 2. The four bolts may be inserted into four orifices 136 in the roller motor mount 134 to secure the roller motor mount 134 of the omni-directional wheel assembly 100 to the mounting plate 130. The four orifices 136 may be each be located at one of four corners of the roller motor mount 134, as shown in FIG. 2. The turntable assembly 10 may also include three sensor units 138. Each sensor unit 138 is located proximate an omni-directional wheel assembly 100, as shown in FIG. 2. The sensor units 138 are configured to detect when a ULD is located on and/or above an omni-directional wheel assembly 100. The sensors units 138 can be ultrasonic sensor and/or Infra-Red and/or any similar sensor configured to detect changes in light and/or changes in color to determine when a ULD is located on and/or above an omni-directional wheel assembly 100. Also an RFID sensor may be integrated with ULD detection sensor to know exactly which ULD has approached the omni-directional wheel assembly 100. The sensor units 138 may each be secured to the mounting plate 130 by one or more fastening mechanisms 139. In an embodiment, the fastening mechanism 139 may be screws or bolts. In another embodiment, two screws or bolts may secure a sensor unit 138 to the mounting plate 130, as shown in FIG. 2. The mounting plate 130 may also include one or more mounting points 140 configured to allow the mounting plate 130 to be secured to an aircraft structure in the cargo compartment of the aircraft having multiple turntable assemblies 10. As shown in FIG. 2, the mounting plate 130 may be circular in shape and the mounting points 140 may be located circumferentially around a perimeter of the circular shape. In an embodiment, there may be four mounting points 140.

Figure 3:
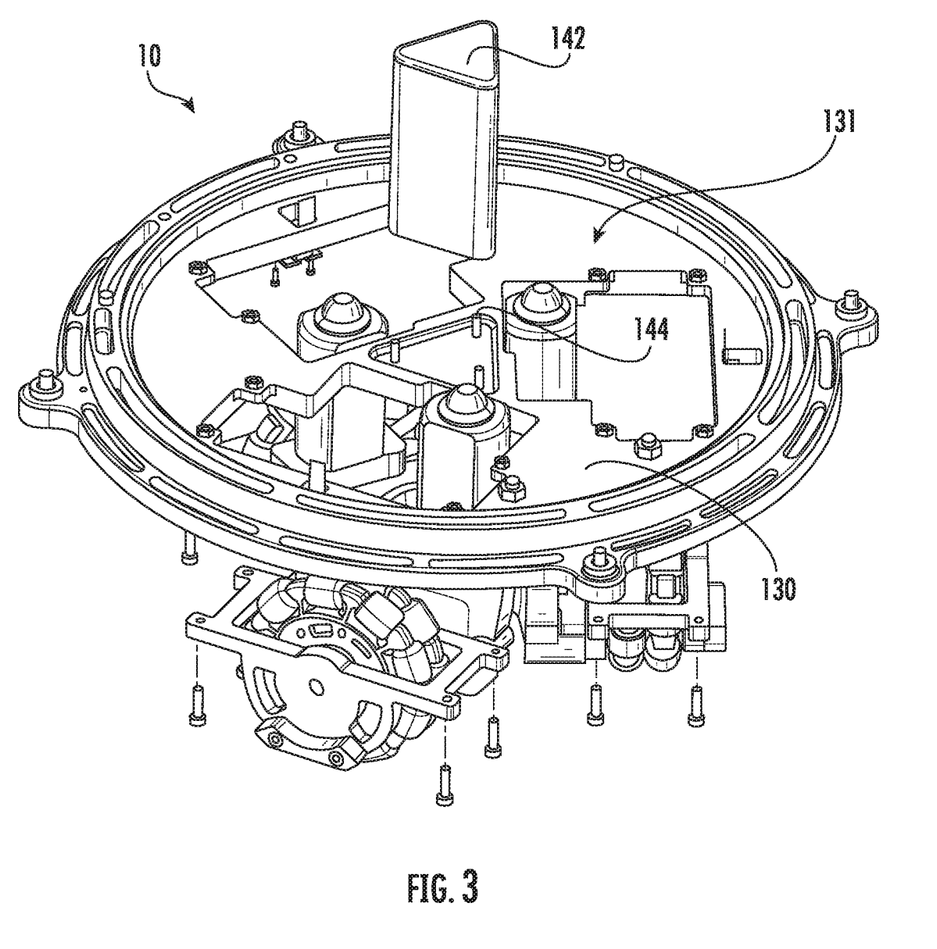
FIG. 3 illustrates an exploded bottom view of the turntable assembly of FIG. 1, according to an embodiment of the present disclosure.

Referring to FIG. 3 with continued reference to FIG. 1, an exploded bottom view of the turntable assembly 10 is illustrated, in accordance with an embodiment of the present disclosure. The turntable assembly 10 also includes a control unit 142 attached to a bottom side 133 of the mounting plate 130. Advantageously, by attaching the control unit 142 to the bottom side 133 of the mounting plate 130, the control unit 142 may be located under a cargo bay floor and out of the way of ULDs moving above. The control unit 142 is configured to control and coordinate the operation of the omni-directional wheel assemblies 100. The control unit 142 may be an electronic controller including a processor and an associated memory comprising computer-executable instructions that, when executed by the processor, cause the processor to perform various operations, such as, for example operation of each of the omni-directional wheel assembly 100. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

Figure 4:
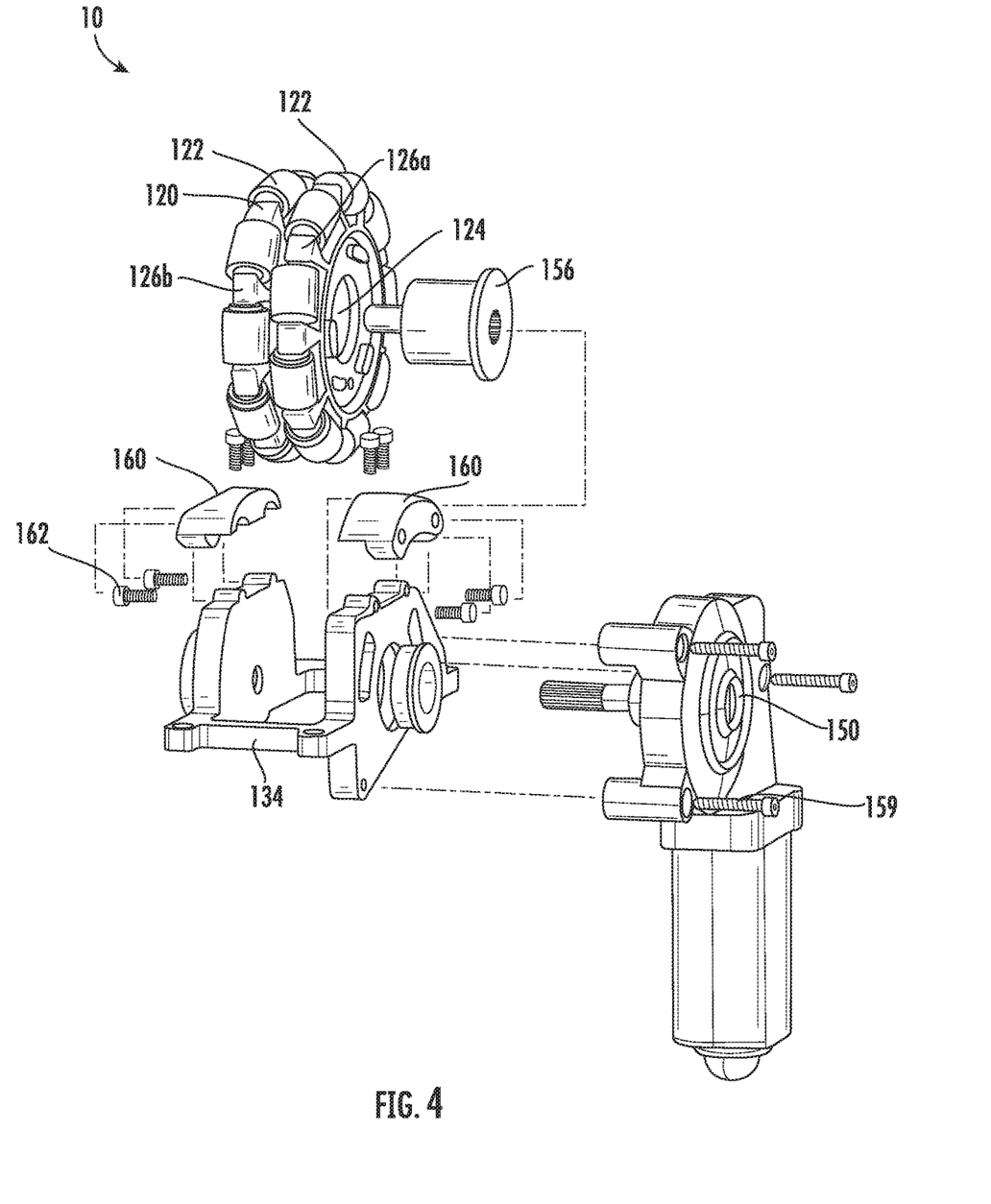
FIG. 4 illustrates an exploded view of an omni-directional wheel assembly of the turntable assembly of FIG. 1, according to an embodiment of the present disclosure.
Figure 5:
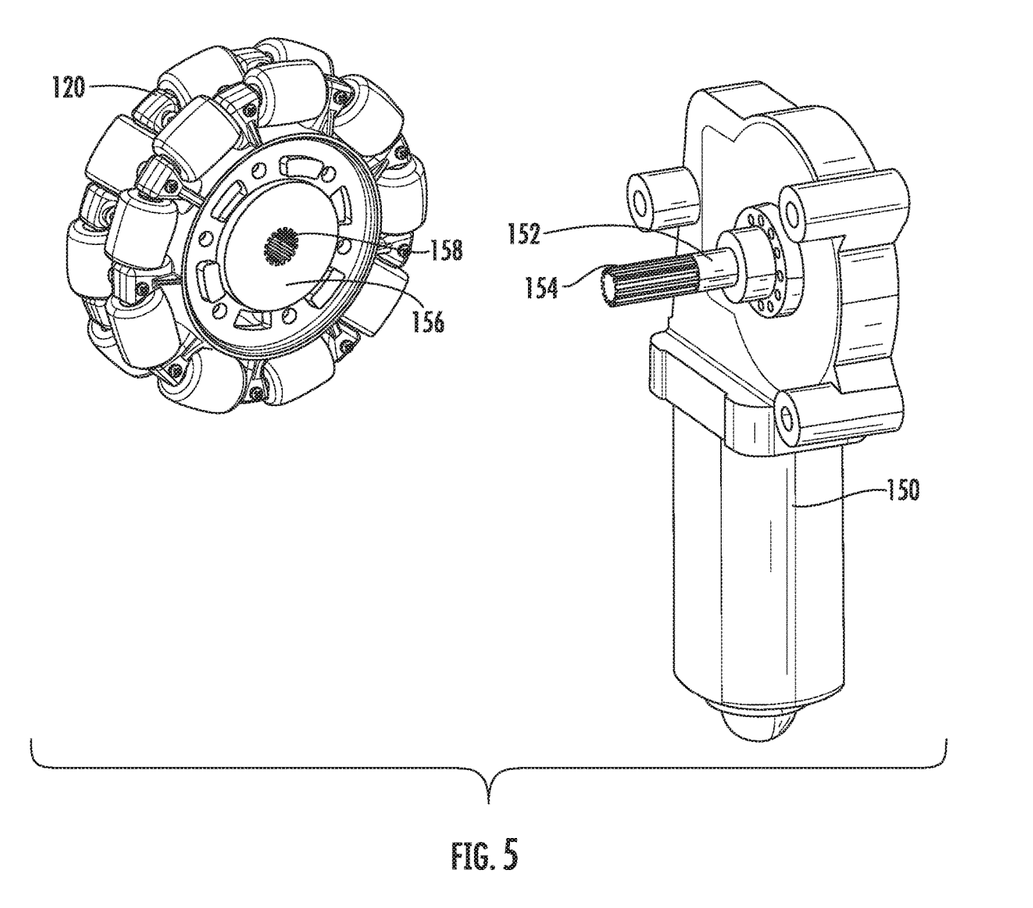
FIG. 5 illustrates an isometric view of a omni wheel and a motor of the omni-directional wheel assembly of FIG. 4, according to an embodiment of the present disclosure.

Referring to FIGS. 4 and 5 with continued reference to FIG. 1, an exploded view of the omni-directional wheel assembly 100 is illustrated, in accordance with an embodiment of the present disclosure. The omni-directional wheel assembly 100 includes the omni wheel 120 and a motor 150 configured to rotate the omni wheel 120. The motor 150 may be an electric motor, such as, for example, a permanent magnet motor or an induction motor. The motor 150 may be a geared motor. The motor 150 may be operably connected to the omni wheel 120 through a bushing 156. External splines 154 on a drive shaft 152 may mate with internal splines 158 of the bushing 156, as shown in FIG. 5. The bushing 156 is secured to an inner orifice 124 of the omni wheel 120. The bushing 156 may be secured to the inner orifice 124 using various methods, including but not limited to a press-fit, a swaged press-fit, an adhesive, etc.

The motor 150 may each be secured to the roller motor mount 134 by one or more fastening mechanisms 159. In an embodiment, the fastening mechanism 159 may be screws or bolts. In another embodiment, three screws or bolts may be used secure the motor 150 to the roller motor mount 134, as shown in FIG. 4.

The rollers 122 may be oriented in a staggered arrangement on two circular rings 126a, 126b of the omni wheel 120. The two circular rings 126a, 126b include a first circular ring 126a and a second circular ring 126b. The first circular ring 126a is oriented adjacent and coaxial to the second circular ring 126a. Thus, the two circular rings 126a, 126b are coaxial to each other. As shown in FIG. 4, with the rollers of the first circular ring 126a may be staggered with the rollers 122 of the second circular ring 126b, so that at any point of time at least one passive roller of Omni wheel will have point of contact with approaching ULD.

Figure 6:
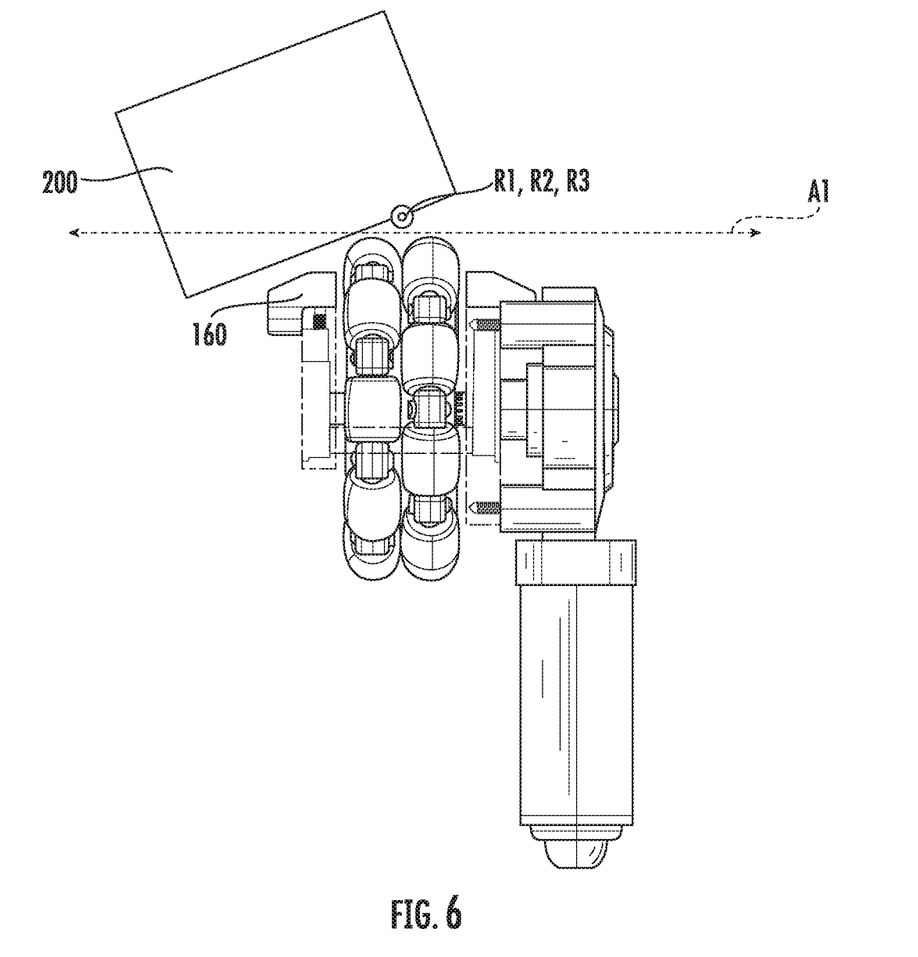
FIG. 6 illustrates an side view of the omni-directional wheel assembly of FIG. 4, according to an embodiment of the present disclosure.

Referring to FIGS. 4 and 6 with continued reference to FIG. 1, a wear cover 160 is illustrated, in accordance with an embodiment of the present disclosure. The omni-directional wheel assembly 100 also may include one or more wear covers 160 configured to protect the omni wheel 120 from side impacts by guiding ULDs 120 over the omni wheel 120 and onto the rollers 122. The wear covers 160 may be shaped similar to a ramp (i.e., ramp shape) to guide the ULD 200 up and over the omni wheel 120. The one or more wear covers 160 are configured to protect the omni wheel 120 a ULD 200 approaching in a direction (show by A1) about perpendicular to the omni wheels 120 tangential angular velocity vector axis R1, R2, R3, (see also FIG. 1). In an embodiment, there may be two wear covers 160 for each omni-directional wheel assembly 100.

The wear cover 160 may each be secured to the roller motor mount 134 by one or more fastening mechanisms 162, as shown in FIG. 4. In an embodiment, the fastening mechanism 162 may be screws or bolts. In another embodiment, four screws or bolts may be used secure the wear cover 160 to the roller motor mount 134, as shown in FIG. 4.

Figure 7:
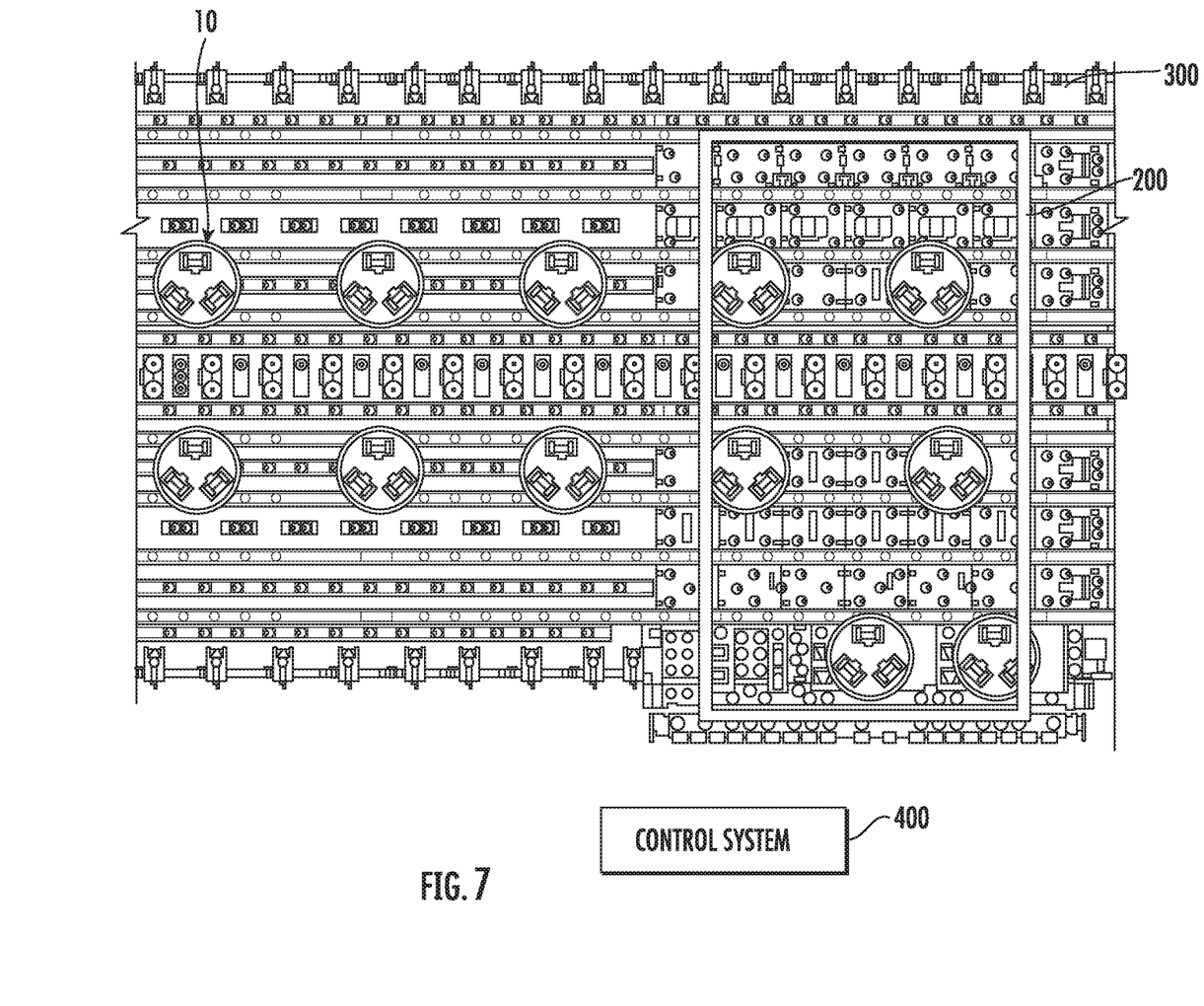
FIG. 7 illustrates top view of multiple turntable assemblies of FIG. 1 installed within a cargo bay floor, according to an embodiment of the present disclosure.

Referring to FIG. 7 with continued reference to FIGS. 1-6, multiple turntable assemblies installed in a cargo bay floor 300 are illustrated, in accordance with an embodiment of the present disclosure. The one or more turntable assemblies installed in the cargo bay floor 300 are installed within a plane of the cargo bay floor 300. The cargo bay floor 300 may be utilized to transport ULDs 200 in an aircraft, shipping container, warehouse, train car, truck cargo container, etc. In an embodiment, the cargo bay floor 300 may be located within a cargo compartment of an aircraft. Each omni-directional wheel assemblies 100 independently controlled or may be controlled in unison, using a control system 400. The control system 400 may be in wired and/or wireless communication with the control unit 142 of each omni-directional wheel assemblies 100. The control system 400 may be controlled manually and/or automatically in order to move the ULD 200 across the cargo bay floor 300. The control system 400 may have an input mechanism for manual control by an individual.

The control system 400 may be an electronic controller including a processor and an associated memory comprising computer-executable instructions that, when executed by the processor, cause the processor to perform various operations, such as, for example operation of each of the turntable assemblies 10. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

Advantageously, the omni-directional wheel assemblies 100 are stationary relative to the mounting plate 130 and the cargo bay floor 300 and do not need to be lifted up and down relative to the cargo bay floor 300, thus save loading time for loading ULDs 200. Advantageously, ULDs may be quickly moved across a cargo bay floor 300 by coordinating the rotation of omni wheels 120 of multiple omni-directional wheel assemblies 100.

Figure 8:
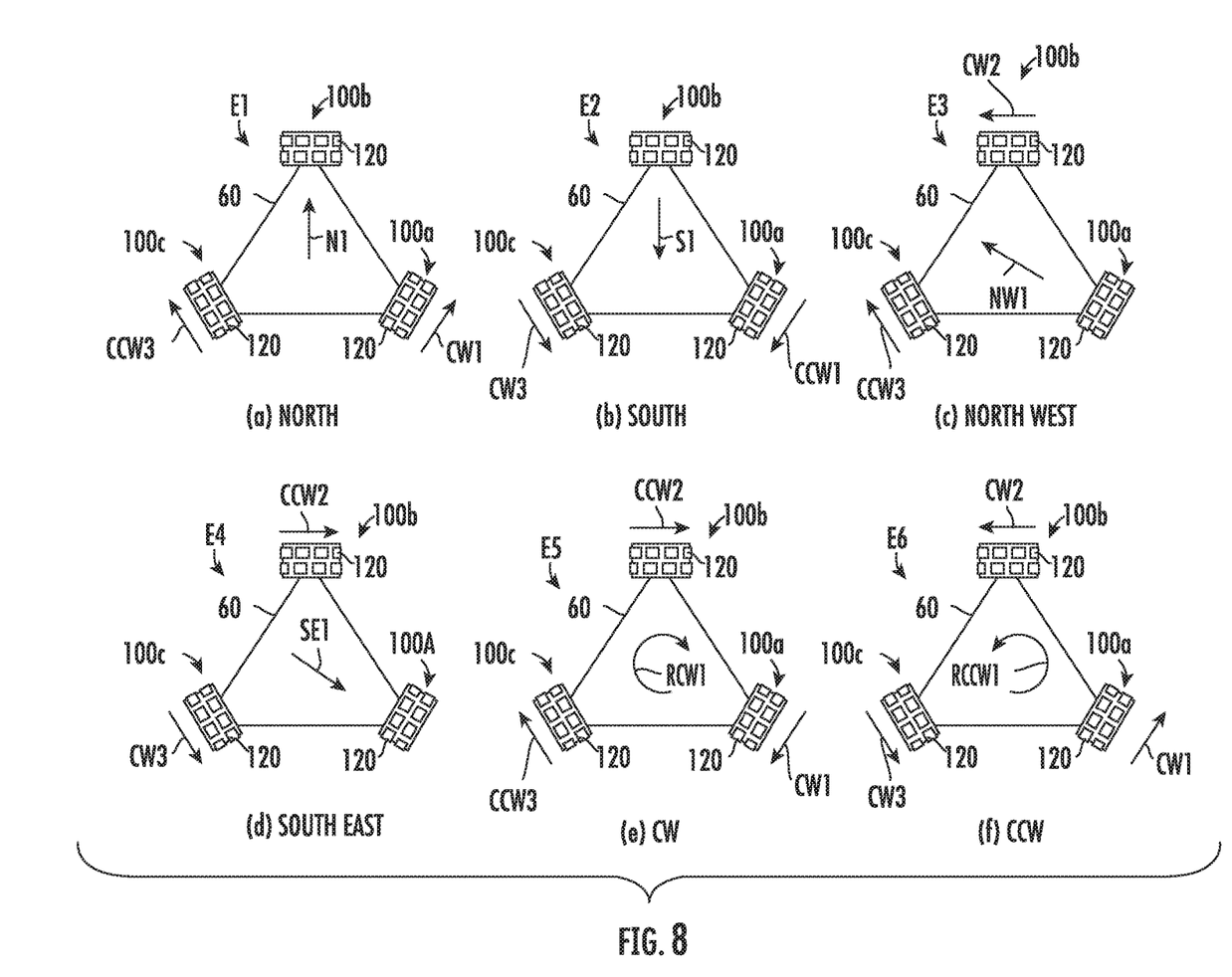
FIG. 8 illustrates methods of rotating a unit load device using the omni-directional wheel assembly of FIG. 4, according to an embodiment of the present disclosure.

Referring to FIG. 8 with continued reference to FIG. 1-7, multiple examples of directional control of the omni-directional wheel assemblies 100 is illustrated, in accordance with an embodiment of the present disclosure. The omnidirection wheel assemblies may move the ULD 200 accordance with but not limited to the examples of E1-E8 below.

In a first example E1 of FIG. 8, the ULD 200 may be moved in a north direction N1 by rotating the omni wheels 120 of the first omni-directional wheel assembly 100a in a clockwise direction CW1 (as defined from outside the triangle 60), not rotating the omni wheels 120 of the second omni-directional wheel assembly 100b, and rotating the omni wheels 120 of the third omni-directional wheel assembly 100c in a counter clockwise direction CCW3 (as defined from outside the triangle 60).

In a second example E2 of FIG. 8, the ULD 200 may be moved in a south direction S1 by rotating the omni wheels 120 of the first omni-directional wheel assembly 100a in a counter clockwise direction CCW1 (as defined from outside the triangle 60), not rotating the omni wheels 120 of the second omni-directional wheel assembly 100b, and rotating the omni wheels 120 of the third omni-directional wheel assembly 100c in a clockwise direction CW3 (as defined from outside the triangle 60).

In a third example E3 of FIG. 8, the ULD 200 may be moved in a north west direction NW1 by not rotating the omni wheels 120 of the first omni-directional wheel assembly 100a, rotating the omni wheels 120 of the second omni-directional wheel assembly 100b in a clockwise direction CW2 (as defined from outside the triangle 60), and rotating the omni wheels 120 of the third omni-directional wheel assembly 100c in a counter clockwise direction CCW3 (as defined from outside the triangle 60).

In a fourth example E4 of FIG. 8, the ULD 200 may be moved in a south east direction SE1 by not rotating the omni wheels 120 of the first omni-directional wheel assembly 100a, rotating the omni wheels 120 of the second omni-directional wheel assembly 100b in a counter clockwise direction CCW2 (as defined from outside the triangle 60), and rotating the omni wheels 120 of the third omni-directional wheel assembly 100c in a clockwise direction CW3 (as defined from outside the triangle 60).

In a fifth example E5 of FIG. 8, the ULD 200 may be rotated in a clockwise direction RCW1 by rotating the omni wheels 120 of the first omni-directional wheel assembly 100a in a counter clockwise direction CCW1 (as defined from outside the triangle 60), rotating the omni wheels 120 of the second omni-directional wheel assembly 100b in a counter clockwise direction CCW2 (as defined from outside the triangle 60), and rotating the omni wheels 120 of the third omni-directional wheel assembly 100c in a counter clockwise direction CCW3 (as defined from outside the triangle 60).

In a sixth example E6 of FIG. 8, the ULD 200 may be rotated in a counter clockwise direction RCCW1 by rotating the omni wheels 120 of the first omni-directional wheel assembly 100a in a clockwise direction CW1 (as defined from outside the triangle 60), rotating the omni wheels 120 of the second omni-directional wheel assembly 100b in a clockwise direction CW2 (as defined from outside the triangle 60), and rotating the omni wheels 120 of the third omni-directional wheel assembly 100c in a clockwise direction CW3 (as defined from outside the triangle 60).

Figure 9:
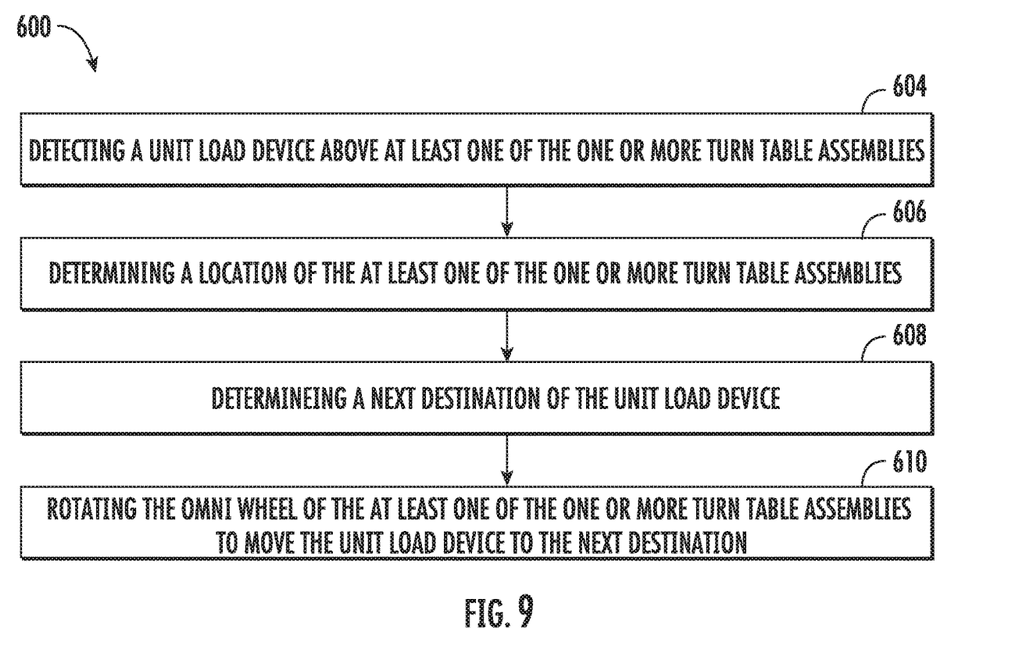
FIG. 9 is a diagram of a method of moving unit load devices on a cargo bay floor, according to an embodiment of the present disclosure.

Referring now to FIG. 9, a method 600 of loading ULDs 200 onto a cargo bay floor 300 is shown, in accordance with an embodiment of the present disclosure. At block 604, a ULD 200 is detected above at least one of the one or more turntable assemblies 10. At block 606, a location of the at least one of the one or more turntable assemblies 10 is determined and the location of the ULD 200 is also determined. At block 608, a next destination of the ULD 200 is determined. The next destination may be the next location along a path of the ULD across the cargo bay floor 300 or the final destination of the ULD 200 on the cargo bay floor 300. At block 610, the omni wheel 120 of the at least one of the one or more turntable assemblies 10 is rotated to move the ULD 200 to the next destination.

Although particular operation sequences are shown, described, and claimed, it should be understood that operations may be performed in any order, separated or combined unless otherwise indicated and will still benefit from the present disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turntable assembly for a cargo bay floor, the turntable assembly comprising:
   three omni-directional wheel assemblies oriented in a triangular orientation forming a triangle with one of the three omni-directional wheel assemblies at each corner of the triangle, wherein each of the three omni-directional wheel assemblies comprise:
   an omni wheel comprising:
      two circular rings being coaxial and adjacent to each other; and
      a plurality of rollers oriented on the two circular rings; and
   a motor operably connected to the omni wheel, the motor being configured to rotate the omni wheel.

2. The turntable assembly of claim 1, wherein the plurality of rollers are configured to rotate in a direction about perpendicular to a direction of a tangential angular velocity vector of the omni wheel.

3. The turntable assembly of claim 1, wherein the plurality of rollers are configured to rotate in a direction about perpendicular to a direction of a tangential angular velocity vector of the omni wheel.

4. The turntable assembly of claim 1, wherein the motor is operably connected to the omni wheel through a bushing.

5. The turntable assembly of claim 4, wherein the omni-wheel includes an inner orifice and the bushing is secured to the inner orifice of the omni-wheel.

6. The turntable assembly of claim 5, wherein the motor includes a drive shaft having external splines and the bushing includes internal splines, and wherein the external splines of the drive shaft are configured to mate with the internal splines of the bushing.

7. The turntable assembly of claim 1, further comprising:
a wear cover configured to protect the omni wheel from impacts in a direction about perpendicular to a direction of a tangential angular velocity vector of the omni wheel.

8. The turntable assembly of claim 7, wherein the wear cover has a ramp shape to direct an object upward and over the omni wheel.

9. The turntable assembly of claim 1, further comprising:
a sensor unit configured to detect when an object is located above each of the three omni-directional wheel assemblies.

10. The turntable assembly of claim 1, further comprising:
three sensor units, each of the three sensor units being located proximate to each of the three omni-directional wheel assemblies.

11. The turntable assembly of claim 10, wherein each of the three sensor units are configured to detect changes in light.

12. The turntable assembly of claim 1, further comprising:
a control unit configured to control and coordinate the operation of the omni-directional wheel assemblies.

13. The turntable assembly of claim 1, wherein the triangle is an equilateral triangle.

14. The turntable assembly of claim 7, wherein each omni-directional wheel assembly includes two wear covers.

15. A cargo bay floor, comprising:
one or more turntable assemblies located within a plane of the cargo bay floor, the one or more turntable assemblies each comprising:
three omni-directional wheel assemblies oriented in a triangular orientation forming a triangle with one of the three omni-directional wheel assemblies at each corner of the triangle, wherein each of the three omni-directional wheel assemblies comprise:
an omni wheel; and
a motor operably connected to the omni wheel, the motor being configured to rotate the omni wheel.

* * * * *